United States Patent
Koo et al.

(10) Patent No.: US 10,585,318 B2
(45) Date of Patent: Mar. 10, 2020

(54) DISPLAY DEVICE AND MANUFACTURING METHOD THEREOF

(71) Applicant: Samsung Display Co., Ltd., Yongin-si, Gyeonggi-do (KR)

(72) Inventors: Bonyong Koo, Asan-si (KR); Dongwon Woo, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/070,975

(22) Filed: Mar. 15, 2016

(65) Prior Publication Data

US 2016/0370674 A1    Dec. 22, 2016

(30) Foreign Application Priority Data

Jun. 18, 2015  (KR) .......................... 10-2015-0086498

(51) Int. Cl.
  *G02F 1/1362*  (2006.01)
  *G02F 1/1345*  (2006.01)

(52) U.S. Cl.
  CPC .... *G02F 1/136227* (2013.01); *G02F 1/13454* (2013.01); *G02F 1/136286* (2013.01); *G02F 2001/136295* (2013.01)

(58) Field of Classification Search
  CPC .......... G02F 1/136227; G02F 1/13454; G02F 1/136286; G02F 2001/136295; G02F 1/13452; G02F 1/13458; G02F 2001/133388; G09G 2310/0264
  See application file for complete search history.

(56) References Cited

U.S. PATENT DOCUMENTS

| | | | | |
|---|---|---|---|---|
| 6,961,111 B1* | 11/2005 | Kuramasu | ........... | G02F 1/13454 349/138 |
| 2002/0171798 A1* | 11/2002 | Tanaka | .............. | G02F 1/136286 349/153 |
| 2003/0058376 A1* | 3/2003 | Zhang | ................. | G02F 1/13454 349/43 |
| 2005/0230757 A1* | 10/2005 | Nagasawa | ............. | G02F 1/1345 257/355 |
| 2006/0139551 A1* | 6/2006 | Kimura | ................. | G02F 1/1345 349/149 |

(Continued)

FOREIGN PATENT DOCUMENTS

| KR | 1994-0015624 A | 7/1994 |
|---|---|---|
| KR | 10-2008-0040505 A | 5/2008 |

(Continued)

*Primary Examiner* — Paisley L Wilson
*Assistant Examiner* — Mariam Qureshi
(74) *Attorney, Agent, or Firm* — Innovation Counsel LLP

(57) ABSTRACT

A display device includes: a display panel including a first substrate and a second substrate facing each other and a liquid crystal layer; and a driving unit on a side of the display panel. The driving unit includes: a first wiring on the first substrate; a first passivation layer on the first wiring, the first passivation layer having first contact holes; a second wiring on the first passivation layer, the second wiring connected to the first wiring through the first contact hole; a second passivation layer on the second wiring, the second passivation layer having second contact holes; a third wiring on the second passivation layer, the third wiring connected to the second wiring through the second contact hole; and a driving integrated circuit ("IC") on the third wiring.

17 Claims, 6 Drawing Sheets

(56) References Cited

U.S. PATENT DOCUMENTS

| | | | |
|---|---|---|---|
| 2008/0106532 A1 | 5/2008 | Choi et al. | |
| 2008/0297685 A1* | 12/2008 | Sugibayashi | G02F 1/1333 349/58 |
| 2009/0027579 A1* | 1/2009 | Aota | G02F 1/134363 349/41 |
| 2011/0291097 A1* | 12/2011 | Ogasawara | G02F 1/1339 257/59 |

FOREIGN PATENT DOCUMENTS

| | | |
|---|---|---|
| KR | 10-2011-0139873 A | 12/2011 |
| KR | 10-2013-0058387 A | 6/2013 |

\* cited by examiner

DISPLAY DEVICE AND MANUFACTURING METHOD THEREOF

CROSS-REFERENCE TO RELATED APPLICATION

This application claims priority to and the benefit of Korean Patent Application No. 10-2015-0086498, filed on Jun. 18, 2015, with the Korean Intellectual Property Office, the disclosure of which is incorporated herein in its entirety by reference.

BACKGROUND

1. Field

Embodiments of the present inventive concept relate to a display device allowing a driving integrated circuit ("IC") to stably contact a side of a display panel, and to a method of manufacturing the display device.

2. Description of the Related Art

Display devices are classified into liquid crystal display ("LCD") devices, organic light emitting diode ("OLED") display devices, plasma display panel ("PDP") devices, electrophoretic display ("EPD") devices, and the like, based on a light emitting scheme thereof.

In general, the display device includes a display panel including two substrates opposing each other and a liquid crystal layer interposed between the two substrates and a driving unit for driving the display panel.

In recent time, a market for smart phones and wearable devices has expanded. In particular, the smart phones and the wearable devices are increasingly manufactured to have a slim size and light weight. The trend toward slimness and light weight of the smart phones and the like leads to the trend toward slimness and light weight of the display devices. Accordingly, the display panel and the driving unit need to be manufactured to have a small size.

Meanwhile, the display panel and the driving unit are electrically connected to each other to transmit various signals. Accordingly, disposition and configuration of the display panel and the driving unit is critical with regard to slimness of the display panel and the driving chip and stable signal transmission between the display panel and the driving unit.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present inventive concept are directed to a display device allowing a driving integrated circuit ("IC") to stably contact a side of a display panel, and to a method of manufacturing the display device.

According to an exemplary embodiment of the present inventive concept, a display device includes: a display panel including a first substrate and a second substrate facing each other and a liquid crystal layer; and a driving unit on a side of the display panel. The driving unit includes: a first wiring on the first substrate; a first passivation layer on the first wiring, the first passivation layer having a plurality of first contact holes exposing the first wiring; a second wiring on the first passivation layer, the second wiring connected to the first wiring through the plurality of the first contact holes; a second passivation layer on the second wiring, the second passivation layer having a plurality of second contact holes exposing the second wiring; a third wiring on the second passivation layer, the third wiring connected to the second wiring through the plurality of second contact holes; and a driving integrated circuit ("IC") on the third wiring, a terminal of the driving IC contacting the third wiring.

The first contact hole may be disposed between the second contact holes in a plan view.

The first contact hole may not overlap the second contact hole.

The first contact hole may at least partially overlap the second contact hole.

The first contact holes may have depths substantially the same as one another.

The second contact holes may have depths substantially the same as one another.

The display device may further include a gate line, a data line, and a pixel electrode on the first substrate.

The first wiring may include a material the same as that forming the gate line.

The second wiring may include a material the same as that forming the data line.

The third wiring may include a material the same as that forming the pixel electrode.

The display device may further include an adhesive layer between the third wiring and the driving IC.

The adhesive layer may be an anisotropic conductive film.

The size of the plurality of first contact holes may be smaller than that of the plurality of second contact holes.

According to an exemplary embodiment of the present inventive concept, a method of manufacturing a display device includes: disposing a first wiring and a first passivation layer sequentially on a first substrate and forming a plurality of first contact holes penetrating the first passivation layer; forming a second wiring on the first passivation layer, the second wiring connected to the first wiring through the plurality of first contact hole; disposing a second passivation layer on the second wiring and forming a plurality of second contact holes penetrating the second passivation layer; forming a third wiring on the second passivation layer, the third wiring connected to the second wiring through the second contact hole; and disposing a driving IC on the third wiring, wherein a terminal of the driving IC contacts the third wiring.

Each of the plurality of first contact hole may be disposed between the plurality of second contact holes in a plan view.

The first contact holes may have depths substantially the same as one another.

The second contact holes may have depths substantially the same as one another.

The first wiring may include a material the same as that forming the gate line, and the second wiring may include a material the same as that forming the data line.

The third wiring may include a material the same as that forming the pixel electrode.

The driving IC may be disposed on the third wiring using an adhesive layer, and the adhesive layer may be an anisotropic conductive film.

According to aspects of exemplary embodiments, the first, second, and third wirings connect the source power and the driving IC in parallel. Accordingly, the first, second, and third wirings may reduce resistance caused when the data signal or the gate signal are transmitted.

In addition, since the driving IC may closely contact the third wiring through the adhesive layer, the data signal or the gate signal may be stably transmitted.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of inventive concept will be more clearly understood from the following detailed description taken in conjunction with the accompanying drawings, in which.

DETAILED DESCRIPTION

Figure 1:
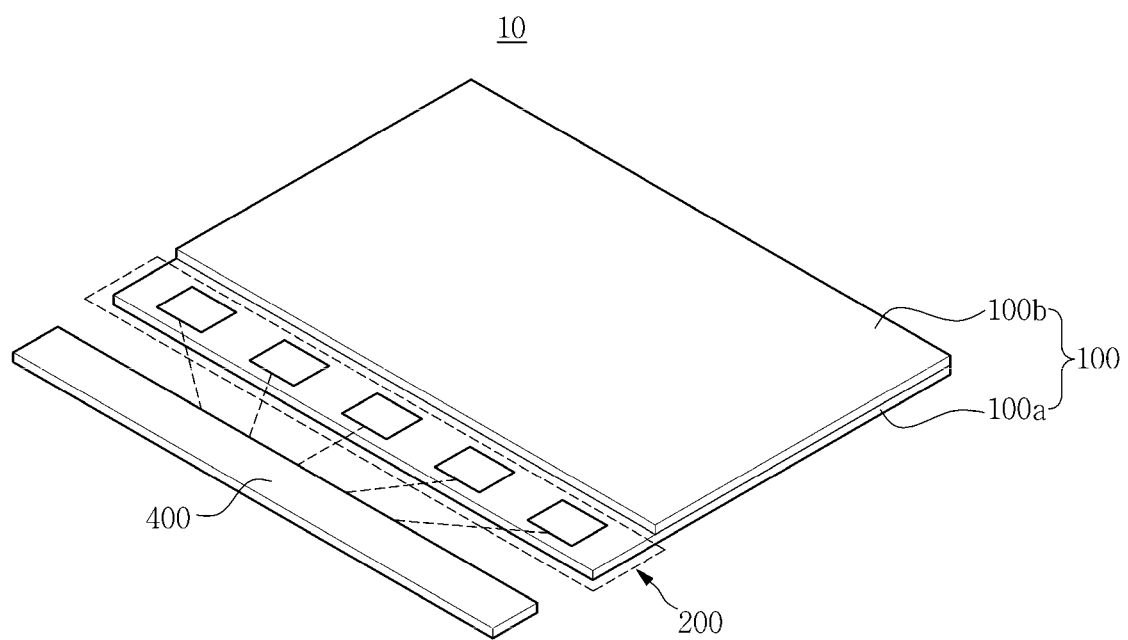
FIG. 1 is a view illustrating a display device according to an exemplary embodiment.

Hereinafter, embodiments of the present disclosure of inventive concept will be described in more detail with reference to the accompanying drawings. Although the present inventive concept can be modified in various manners and have several embodiments, specific embodiments are illustrated in the accompanying drawings and will be mainly described in the specification. However, the scope of the embodiments of the present inventive concept is not limited to the specific embodiments and should be construed as including all the changes, equivalents, and substitutions included in the spirit and scope of the present inventive concept.

In the drawings, certain elements or shapes may be simplified or exaggerated to better illustrate the present inventive concept, and other elements present in an actual product may also be omitted. Like reference numerals refer to like elements throughout the specification. Thus, the drawings are intended to facilitate the understanding of the present inventive concept.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

In addition, when a layer or element is referred to as being "on" another layer or element, the layer or element may be directly on the other layer or element, or one or more intervening layers or elements may be interposed therebetween.

Figure 2:
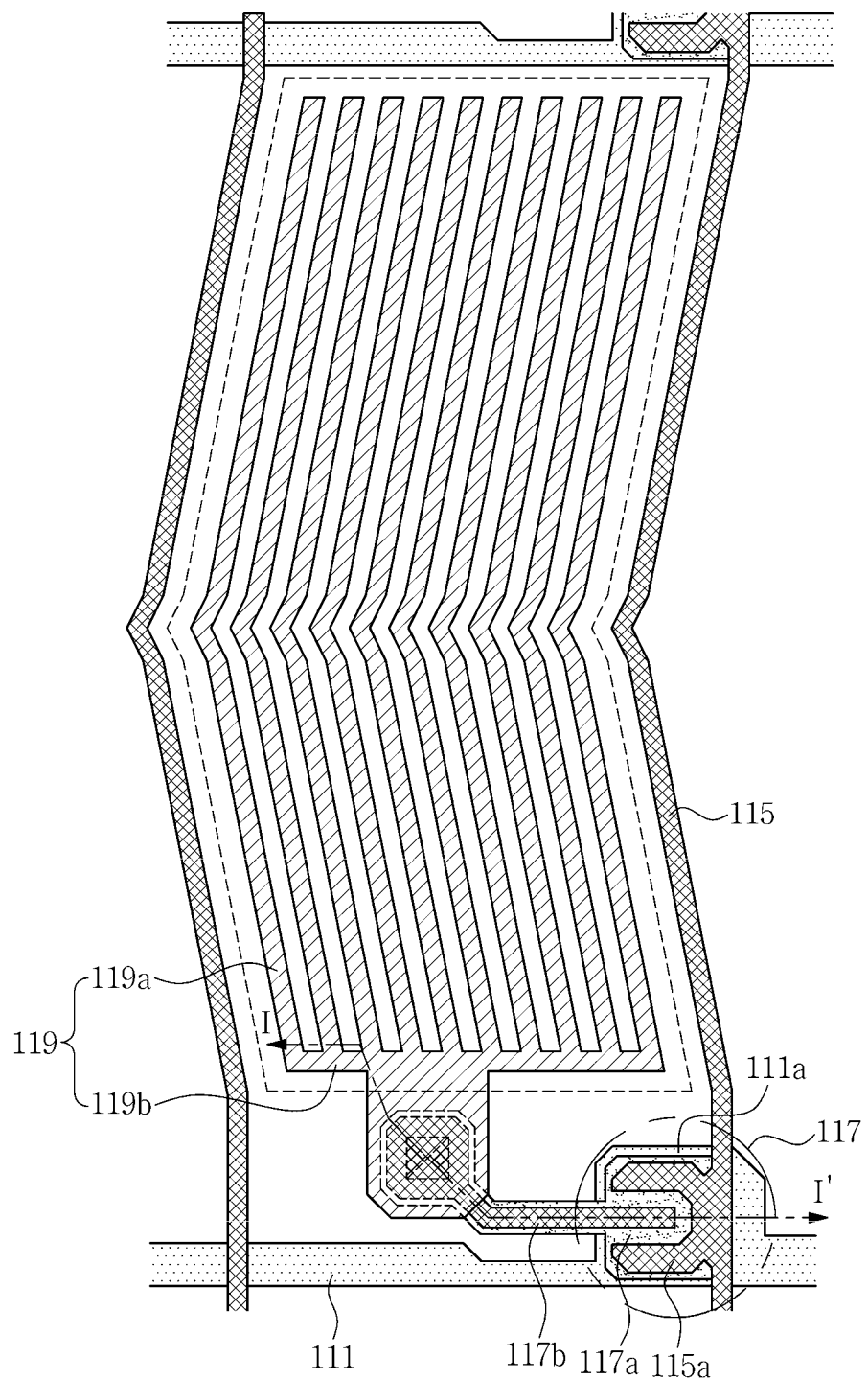
FIG. 2 is a plan view illustrating a display panel of FIG. 1.
Figure 3:
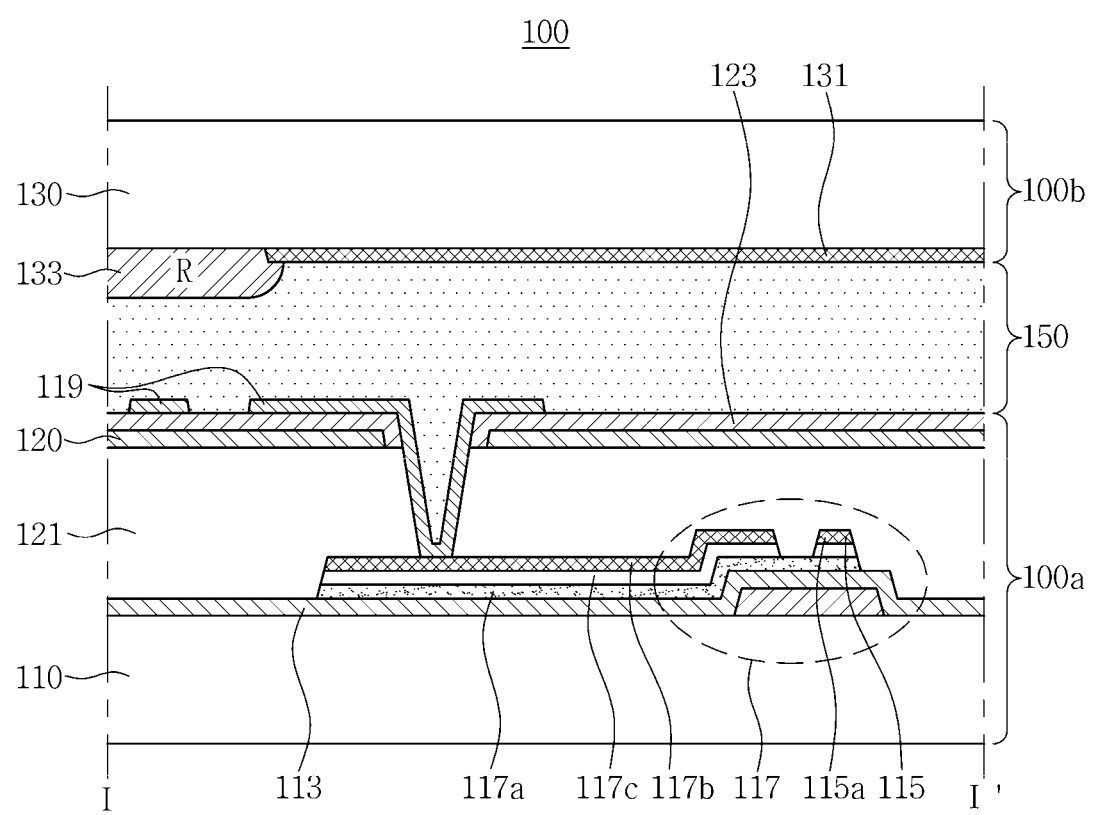
FIG. 3 is a cross-sectional view taken along line I-I' of FIG. 2.

Hereinafter, a display device 10 according to an exemplary embodiment will be described with reference to the accompanying drawing. FIG. 1 is a view illustrating the display device 10 according to an exemplary embodiment. FIG. 2 is a plan view illustrating a display panel 100 of FIG. 1. FIG. 3 is a cross-sectional view taken along line I-I' of FIG. 2.

In reference to FIGS. 1, 2, and 3, the display device 10 according to an exemplary embodiment includes a display panel 100 and a driving unit 200 on a side of the display panel 100. The display panel 100 includes a lower panel 100a, an upper panel 100b, and a liquid crystal layer 150 interposed between a lower panel 100a and an upper panel 100b.

Herein, the lower panel 100a includes a first substrate 110, a gate line 111 and a gate insulating layer 113 on the first substrate 110, a data line 115 on the gate insulating layer 113, a transistor 117, a first insulating layer 121 on the data line 115 and the transistor 117, and a common electrode 120 and a pixel electrode 119 on the first insulating layer 121.

The first substrate 110 is an insulating substrate formed of transparent glass such as soda lime glass or borosilicate glass, plastic, or the like.

A plurality of gate lines 111 are disposed on the first substrate 110 to transmit a gate signal. The gate line 111 extends in a direction, for example, in a transverse direction. Meanwhile, the gate line 111 is connected to the transistor 117 which is to be described further below.

The gate line 111 may be formed of an aluminum (Al) based metal such as Al or an Al alloy, a silver (Ag) based metal such as Ag or an Ag alloy, a copper (Cu) based metal such as Cu or a Cu alloy, a molybdenum (Mo) based metal such as Mo or a Mo alloy, chromium (Cr), titanium (Ti), tantalum (Ta), or the like.

In addition, the gate line 111 may have a multilayer structure including two conductive layers (not illustrated) having different physical properties.

For example, one of the two conductive layers may include metal having low resistivity so as to reduce signal delay or voltage drop, for example, an aluminum (Al)-based metal, a silver (Ag)-based metal, a copper (Cu)-based metal, or the like.

On the other hand, the other of the two conductive layers may include a material that is found to impart an excellent contact property with transparent conductive oxide (TCO), such as indium tin oxide (ITO), indium zinc oxide (IZO), or aluminum zinc oxide (AZO). Examples of such a material may include a molybdenum-based metal, chromium, titanium, tantalum, and the like.

The data line 115 is disposed in a direction intersecting the gate line 111, for example, a longitudinal direction. The data line 115 is connected to the transistor 117 to be described further below. Herein, the data line 115 is connected to the transistor 117 through a source electrode 115a. The data line 115 transmits a data signal voltage to the pixel electrode 119, to be described below, through the transistor 117.

The gate insulating layer 113 is disposed between the gate line 111 and the data line 115. The gate insulating layer 113 is formed over an entire surface of the first substrate 110 so as to cover and insulate the gate line 111. The gate insulating layer 113 may be formed of silicon oxide (SiOx), silicon nitride (SiNx), or the like. In addition, the gate insulating layer 113 may have a multilayer structure including two insulating layers (not illustrated) having different physical properties.

The gate insulating layer 113 is configured to prevent a short circuit of the gate lines 120. Further, the gate insulating layer 113 may serve to insulate the gate line 111 from other conductive thin films disposed above the gate line 111.

A semiconductor layer 117a, a source electrode 115a and a drain electrode 117b which comprise the transistor 117 are disposed on the gate insulating layer 113. In detail, the transistor 117 includes a gate electrode 111a, a semiconductor layer 117a on the gate insulating layer 113 and the data line 115.

The transistor 117 includes the semiconductor layer 117a, a source electrode 115a, a drain electrode 117b, and the gate electrode 111a. Herein, the source electrode may be a portion of the data line 115 protruding from the data line 115 onto the semiconductor layer 117a. Meanwhile, the drain electrode 117b may be disposed to at least partially overlap the pixel electrode 119, and the gate electrode 111a may be formed to protrude from the gate line 111 toward the semiconductor layer 117a.

Accordingly, the source electrode 115a connects the transistor 117 and the data line 115, and the drain electrode 117b connects the transistor 117 and the pixel electrode 119 to be described below. In addition, the gate electrode 111a connects the transistor 117 and the gate line 111.

The gate electrode 111a is disposed to overlap the semiconductor layer 117a in a plan view. Herein, the semiconductor layer 117a forms a channel through which current may flow.

Meanwhile, an ohmic contact layer 117c is disposed on the semiconductor layer 117a. The ohmic contact layer 117c is configured to improve a contact property between the semiconductor layer 117a and the source electrode 115a and/or the drain electrode 117b.

For example, the ohmic contact layer 117c may include amorphous silicon doped with n-type impurities at high concentration (hereinafter, "n+a-Si"). In a case where the contact property between the semiconductor layer 117a and the source electrode 115a and/or the drain electrode 117b is sufficiently secured, the ohmic contact layer 117c may be omitted in the present exemplary embodiment.

The first insulating layer 121 is disposed on the transistor 117, the data line 115, and the gate insulating layer 113. The first insulating layer 121 may have a monolayer structure or a multilayer structure including, for example, silicon oxide, silicon nitride, a photosensitive organic material, or a low dielectric constant insulating material such as a-Si:C:O or a-Si:O:F.

The first insulating layer 121 is configured to cover the transistor 117, the data line 115, and the gate insulating layer 113 to protect them, and insulate the transistor 117 and the data line 115 from other conductive materials disposed above the first insulating layer 121.

The common electrode 120 is disposed on the first insulating layer 121. Further, the common electrode 120 is disposed to overlap the pixel electrode 119 to be described below. As an example, the common electrode 120 has a planar surface shape, and may be formed of a transparent conductive oxide (TCO), such as indium tin oxide (ITO), indium zinc oxide (IZO), or aluminum zinc oxide (AZO).

The second insulating layer 123 is disposed on the common electrode 120 and the first insulating layer 121. The second insulating layer 123 spatially separates the common electrode 120 and the pixel electrode 119. Accordingly, the second insulating layer 123 insulates the common electrode 120 and the pixel electrode 119. Meanwhile, an electric field is formed between the common electrode 120 and the pixel electrode 119, and the liquid crystal layer 150 is controlled using the electric field.

The second insulating layer 123 may have a monolayer structure or a multilayer structure including, for example, silicon oxide, silicon nitride, a photosensitive organic material, or a low dielectric constant insulating material such as a-Si:C:O or a-Si:O:F. Herein, in a case where the second insulating layer 123 is formed of a photosensitive organic material, the second insulating layer 123 may be referred to as an organic layer.

The pixel electrode 119 is disposed on the second insulating layer 123. The common electrode 120 is disposed below the pixel electrode 119 to overlap the pixel electrode 119. As the pixel electrode 119 is spatially separated from the common electrode 120 by the second insulating layer 123, an electric field is formed between the pixel electrode 119 and the common electrode 120.

The pixel electrode 119 has a linear shape, and the linear shaped pixel electrode is provided in plural to be spaced apart from each other. In reference to FIG. 2, the pixel electrode 119 may include a stem electrode 119b having a linear shape and a branch electrode 119a having a linear shape.

The stem electrode 119b extends in a first direction. Further, the stem electrode 119b is disposed to be substantially parallel to the gate line 111. The stem electrode 119b has a portion protruded toward the transistor 117 to be connected to the drain electrode 117b of the transistor 117. Herein, the drain electrode 117b of the transistor 117 may overlap the protruded portion of the stem electrode 119b.

The branch electrode 119a extends in a second direction which cross the first direction and branched from the stem electrode 119b. Further, the branch electrode 119a is disposed to be substantially parallel to the data line 115. The branch electrode 119a may be provided in plural, and in this case, may be disposed to be spaced apart from each other in a length direction of the stem electrode 119b.

In an exemplary embodiment, the pixel electrode 119 may be formed of a transparent conductive oxide (TCO), such as indium tin oxide (ITO), indium zinc oxide (IZO), or aluminum zinc oxide (AZO).

The upper panel 100b may include a second substrate 130, a light blocking layer 131 on the second substrate 130, and a color filter layer 133.

The second substrate 130 is disposed to oppose the first substrate 110. The second substrate 130 is an insulating substrate formed of transparent glass such as soda lime glass or borosilicate glass, plastic, or the like.

The light blocking layer 131 is also referred to as a black matrix, and is configured to separate the plurality of color filters 133 from one another, define a pixel region, and prevent light leakage. The light blocking layer 131 may have a lattice form disposed along the gate line 111 and the data line 115. In addition, the light blocking layer 131 may overlap the gate line 111, the data line 115, and the transistor 117.

The color filter layer 133 may be formed over an entire surface of the second substrate 210. In addition, the color filter layer 133 may include a red color filter, a green color filter, and a blue color filter. Herein, the respective color filters are disposed to correspond to the pixel region. Accordingly, the red color filter forms a red pixel region, the green color filter forms a green pixel region, and the blue color filter forms a blue pixel region.

Figure 4:
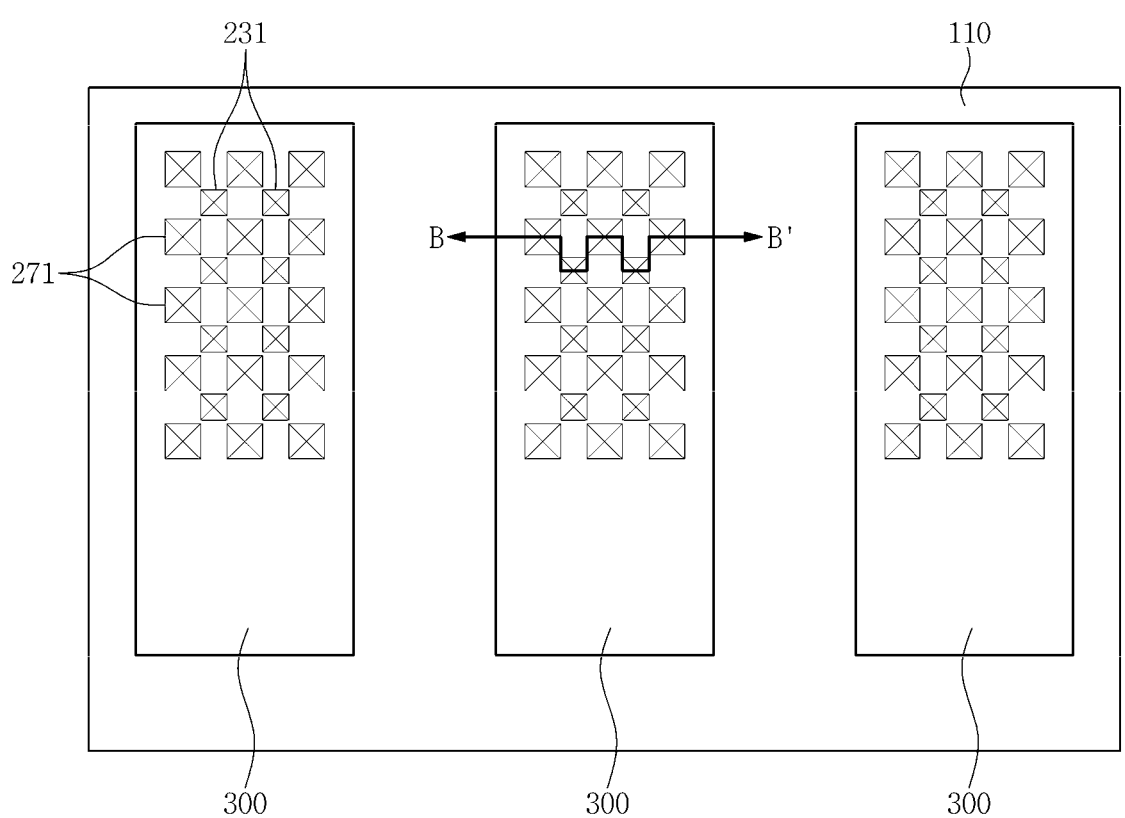
FIG. 4 is a plan view illustrating a driving unit of FIG. 1.
Figure 5:
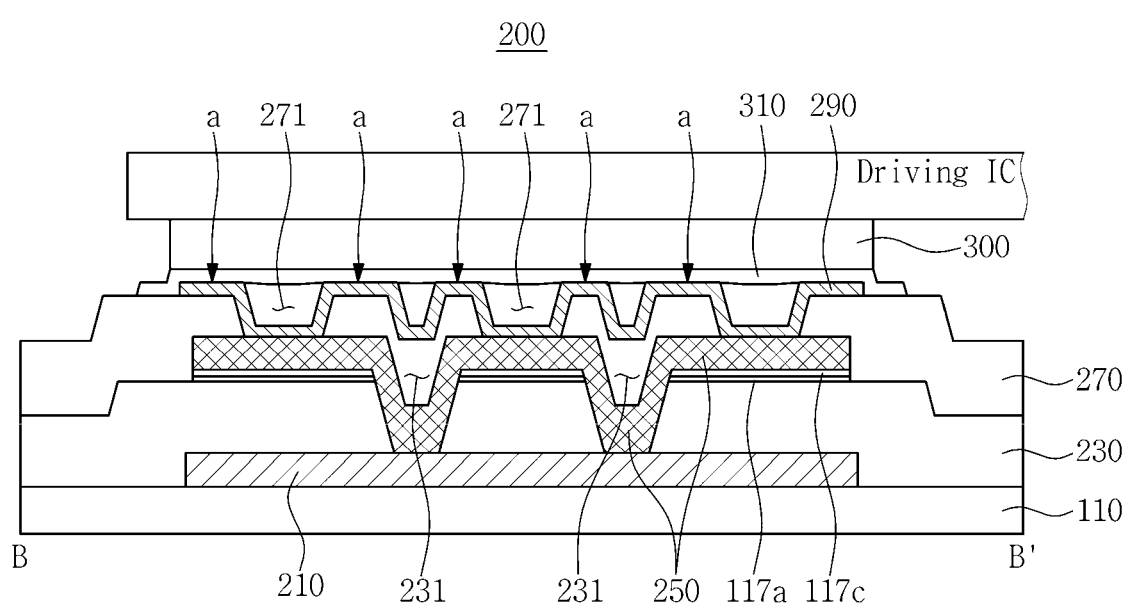
FIG. 5 is a cross-sectional view taken along line B-B' of FIG. 4.
Figure 6:
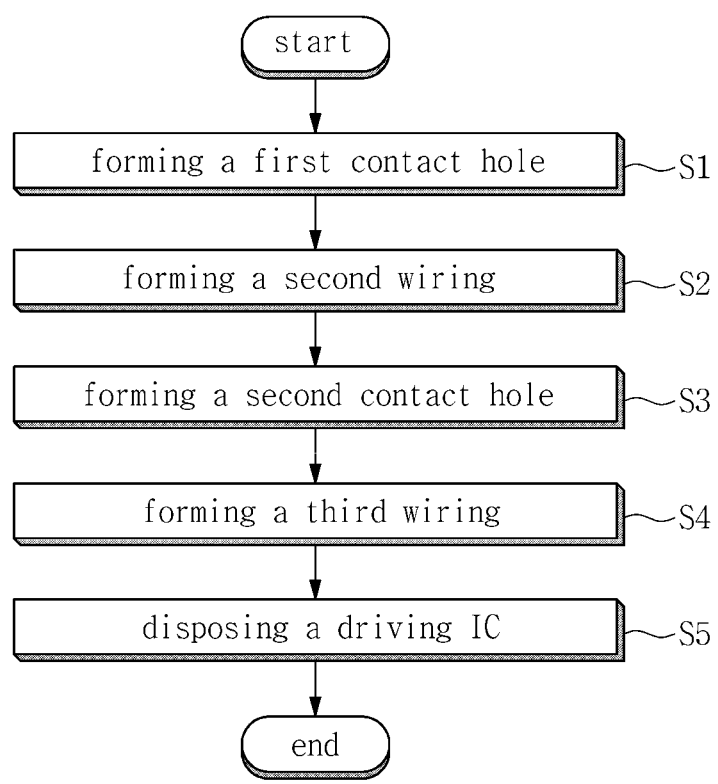
FIG. 6 is a flow chart illustrating a method of manufacturing the display device according to an exemplary embodiment.

FIG. 4 is a plan view illustrating the driving unit 200 of FIG. 1, and FIG. 5 is a cross-sectional view taken along line B-B' of FIG. 4.

In reference to FIGS. 4 and 5, the driving unit 200 includes a first wiring 210 on the first substrate 110, a first passivation layer 230 on the first wiring 210, a second wiring 250 on the first passivation layer 230, a second passivation layer 270 on the second wiring 250, a third wiring 290 on the second passivation layer 270, and a terminal 300 on a driving integrated circuit ("IC") on the third wiring 290.

In addition, the driving unit 200 may further include an adhesive layer 310 between the third wiring 290 and the terminal 300.

The first wiring 210 is disposed on a side of the first substrate 110. The first wiring 210 may be provided in a plate shape or a surface shape, and the plurality of the first wirings 210 may be disposed to be spaced apart from each other. In addition, the first wiring 210 may include a material the same as that of the gate line 111.

For example, the first wiring 210 may be formed of an aluminum (Al) based metal such as Al or an Al alloy, a silver (Ag) based metal such as Ag or an Ag alloy, a copper (Cu) based metal such as Cu or a Cu alloy, a molybdenum (Mo) based metal such as Mo or a Mo alloy, chromium (Cr), titanium (Ti), tantalum (Ta), or the like.

In addition, the first wiring 210 may be formed simultaneously with the gate line 111 on the first substrate 110.

The first passivation layer 230 is disposed on the first wiring 210 and the first substrate 110. The first passivation layer 230 covers the first wiring 210 to allow the first wiring 210 to be spatially separated from conductive materials above the first passivation layer 230.

The first passivation layer 230 may be formed of a material the same as a material forming the gate insulating layer 113. For example, the first passivation layer 230 may include silicon oxide and/or silicon nitride, a photosensitive organic material, or a low dielectric constant insulating material such as a-Si:C:O or a-Si:O:F.

Further, the first passivation layer 230 may be formed simultaneously with the gate insulating layer 113. In this case, the first passivation layer 230 may have a monolayer structure or a multilayer structure based on the structure of the gate insulating layer 113. In an alternative exemplary embodiment, the first passivation layer 230 may be formed simultaneously with one of the gate insulating layer 113. Meanwhile, the first passivation layer 230 has a first contact hole 231, which will be described further below.

The second wiring 250 is disposed on the first passivation layer 230. The second wiring 250 is connected to the first wiring 210 through the first contact hole 231. The second wiring 250 may have a plate shape or a linear shape, and the second wirings 250 may be spaced apart from each other.

The second wiring 250 may be formed of a material the same as a material forming the data line 115. For example, the second wiring 250 may be formed of refractory metal, such as molybdenum, chromium, tantalum, titanium, or a metal alloy thereof.

Further, the second wiring 250 may have a multi-layer structure including a refractory metal layer and a low-resistance conductive layer. Examples of the multi-layer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer.

Meanwhile, the second wiring 250 may be formed simultaneously with the data line 115 and the source electrode 115a. Accordingly, in a case where the semiconductor layer 117a and the ohmic contact layer 117c are disposed below the source electrode 115a, the semiconductor layer 117a and the ohmic contact layer 117c may be disposed below the second wiring 250.

The second passivation layer 270 is disposed one the second wiring 250. The second passivation layer 270 covers the second wiring 250 to allow the second wiring 250 to be spatially separated from conductive materials above the second passivation layer 270.

The second passivation layer 270 may be formed of a material the same as a material forming the gate insulating layer 113. For example, the second passivation layer 270 may include silicon oxide, silicon nitride, a photosensitive organic material, or a low dielectric constant insulating material such as a-Si:C:O or a-Si:O:F.

Further, the second passivation layer 270 may be formed simultaneously with the first insulating layer 121. In this case, the second passivation layer 270 may have a monolayer structure or a multilayer structure based on the structure of the first insulating layer 121. Meanwhile, the second passivation layer 270 has a second contact hole 271, which will be described further below.

The third wiring 290 is disposed on the second passivation layer 270. The third wiring 290 is connected to the second wiring 250 through the second contact hole 271. The third wiring 290 may have a plate shape or a linear shape, and the third wirings 290 may be spaced apart from each other.

The third wiring 290 is formed of a material the same as that forming the pixel electrode 119. For example, the third wiring 290 may be formed of transparent conductive oxide (TCO), such as indium tin oxide (ITO), indium zinc oxide (IZO), or aluminum zinc oxide (AZO).

The first contact hole 231 penetrates the first passivation layer 230 vertically. Further, the second contact hole 271 penetrates the second passivation layer 270 vertically.

In reference to FIGS. 4 and 5, the first contact hole 231 may include a plurality of first contact holes formed through the first passivation layer 230, and the second contact hole 231 may include a plurality of second contact holes formed through the second passivation layer 270. In an exemplary embodiment, the first contact hole 231 and the second contact hole 271 may be disposed not to overlap each other in a plan view. In other words, the first contact hole 231 may be disposed between the second contact holes 271.

In an alternative exemplary embodiment, the first contact hole 231 and the second contact hole 271 may be positioned to overlap each other. In this regard, a portion of the first contact hole 231 may overlap the second contact hole 271, and alternatively, an entire portion of the first contact hole 231 may overlap the second contact hole 271. In addition, when each of the first contact hole 231 and the second contact hole 271 is provided in plural, at least one of the first contact holes 231 may overlap the second contact hole 271.

Meanwhile, as the first passivation layer 230 has a uniform thickness, the plurality of first contact holes 231 may have substantially the same depth. Further, as the second passivation layer 270 has a uniform thickness, the plurality of second contact holes 271 may have substantially the same depth.

Herein, the first contact hole 231 and the second contact hole 271 may have the same depth, but alternatively, may have different depths.

As the plurality of first contact holes 231 have the same depth, and the plurality of second contact holes 271 have the same depth, an upper surface of the third wiring 290 may be disposed on a same planar surface. Accordingly, the driving IC, to be described below, may stably contact the third wiring 290.

The terminal pad 300 is disposed on the third wiring 290. The terminal 300 is configured to receive a data signal or a gate signal from a source power 400 and drive the display panel 100. That is, the terminal 300 transmits the data signal or the gate signal to the driving IC, and in the transmission process, the first, second, and third wirings 210, 250, and 290 electrically connect the source power 400 and the driving IC.

Accordingly, since being provided in plural, the first, second, and third wirings 210, 250, and 290 may reduce resistance to thereby improve properties of transmission of the data signal or the gate signal.

Meanwhile, the adhesive layer 310 is disposed between the terminal 300 and the third wiring 290. The adhesive layer 310 attaches and electrically connects the terminal 300 to the third wiring 290. In detail, the adhesive layer 310 is compressed between a horizontal surface (a) of the third wiring 290 and the terminal 300 to be fixed therewithin.

For example, the adhesive layer 310 may be an anisotropic conductive film including a micro conductive ball. In a case where the anisotropic conductive film is compressed, the conductive ball in a portion being compressed is connected to the third wiring 290 and a terminal 300, such that electric current may be transmitted from the source power 400 to the terminal 300.

That is, when the adhesive layer 310 and the driving IC are sequentially disposed on the third wiring 290 to be compressed, the horizontal surface (a) of the third wiring 290 and the terminal 300 are compressed, such that the conductive ball therebetween contacts the third wiring 290 and a terminal 300 and the electric current may be transmitted.

Meanwhile, when the adhesive layer 310 and the driving IC 300 are compressed, the adhesive layer 310 on the second contact hole 271 may be partially inserted within the second contact hole 271 to be attached thereto.

The upper panel 100b is disposed to face the lower panel 100a. Further, the upper panel 100b may include the second substrate 210, the light blocking layer 131, and the color filter layer 133.

The second substrate 130 is disposed to oppose the first substrate 110. The second substrate 130 is an insulating substrate formed of transparent glass such as soda lime glass or borosilicate glass, plastic, or the like.

The light blocking layer 131 and the color filter layer 133 may be disposed on the second substrate 130. The light blocking layer 131 defines the pixel region and significantly reduces light leakage. The color filter layer 133 may include a red color filter, a green color filter, and a blue color filter.

A configuration of the display device 10 according to an exemplary embodiment is described hereinabove, and a method of manufacturing the display device 10 according to an exemplary embodiment will be described hereinbelow.

A method of manufacturing the display device 10 according to an exemplary embodiment includes: defining a first contact hole 231 in the first passivation layer 230 (S1), forming the second wiring 250 on the first passivation layer 230 (S2), disposing the second passivation layer 270 on the second wiring 250 and defining the second contact hole 271 in the second passivation layer 270 (S3), forming the third wiring 290 on the second passivation layer 270(S4), and disposing the driving IC having the terminal 300 on the third wiring 290 (S5).

The first contact hole 231 is defined in the first passivation layer 230 that is disposed on the first substrate 110 (S1). The first contact hole 231 may be provided in plural. For example, the first contact hole 231 may be defined using a photolithography process. In an exemplary embodiment, the first passivation layer 230 are disposed on the first wiring 210 which is disposed on the first substrate 110, and the photoresist is coated on the first passivation layer 230. Herein, the first wiring 210 may be formed of a material the same as that forming the gate line 111, and may be formed simultaneously with the gate line 111.

After coating the photoresist, the photoresist is patterned using the conventional light exposure and development processes, then, the exposed portion of the first passivation layer 230 is etched to form the first contact hole 231 in the first passivation layer 230.

The second wiring 250 is formed on the first passivation layer 230 (S2). The second wiring 250 is directly connected to the first wiring 210 through the first contact hole 231. Herein, the second wiring 250 may be formed of a material the same as that forming the data line 115, and may be formed simultaneously with the data line 115.

The second contact hole 271 is defined in the second passivation layer 270 on the second wiring 250 and the first passivation layer 230 (S3). The second contact hole 271 may be disposed between the first contact holes 231. Herein, the second contact hole 271 may not overlap the first contact hole 231. Alternatively, the second contact hole 271 may at least partially overlap the first contact hole 231.

The second contact hole 271 may be formed using a photolithograph process in the same manner as a manner used to define the first contact hole 231. In other words, after coating a photoresist on the second passivation layer, the photoresist is patterned using the conventional light exposure and development processes, then, the exposed portion of the second passivation layer 270 is etched ti firm the second contact hole 231 in the second passivation layer 270.

The third wiring 290 is formed on the second passivation layer 270 (S4). The third wiring 290 is directly connected to the second wiring 250 through the second contact hole 271. Herein, the third wiring 290 may be formed of a material the same as that forming the pixel electrode 119, and may be formed simultaneously with the pixel electrode 119.

The driving IC is disposed on the third wiring 290 (S5). In particular, the terminal 300 is fixed to the third wiring 290 by the adhesive layer 310. Herein, the adhesive layer 310 may be an anisotropic conductive film. The driving IC receives a data signal or a gate signal from the source power 400 to drive the display panel 100.

As set forth hereinabove, in the display device 10 according to an exemplary embodiment, the first wiring 210, the first passivation layer 230, the second wiring 250, the second passivation 270, the third wiring 290, and the driving IC having the terminal 300 are sequentially disposed on the first substrate 110. In addition, the first contact hole 231 is defined in the first passivation layer 230, and the second contact hole 271 is defined in the second passivation layer 270.

Herein, the second wiring 250 is connected to the first wiring 210 through the first contact hole 231, and the third wiring 290 is connected to the second wiring 250 through the second contact hole 271. Accordingly, the first, second, and third wirings 210, 250, and 290 connect the source power 400 and the driving IC. With such a configuration, the first, second, and third wirings 210, 250, and 290 may reduce resistance caused when the data signal or the gate signal are transmitted.

In addition, since the terminal 300 may closely contact the third wiring 290 through the adhesive layer 310, the data signal or the gate signal may be stably transmitted.

From the foregoing, it will be appreciated that various embodiments in accordance with the present disclosure have been described herein for purposes of illustration, and that various modifications may be made without departing from the scope and spirit of the inventive concept. Accordingly, the various exemplary embodiments disclosed herein are not intended to be limiting of the true scope and spirit of the inventive concept. Various features of the above described and other exemplary embodiments can be mixed and matched in any manner, to produce further exemplary embodiments consistent with the inventive concept.

What is claimed is:

1. A display device comprising:
    a display panel comprising a first substrate on which a thin film transistor is disposed, a second substrate facing the first substrate, a liquid crystal layer between the first substrate and the second substrate, and a driving unit on a side of the first substrate,
    wherein the driving unit comprises:
    a first wiring on the first substrate, the first wiring being formed of a same material and formed on a same plane with one electrode forming the thin film transistor and formed in one piece;
    a first passivation layer on the first wiring, the first passivation layer having a plurality of first contact holes exposing the first wiring;
    a second wiring on the first passivation layer, the second wiring being formed of a same material and formed on a same plane with one electrode forming the thin film transistor and formed in one piece, and connected to the first wiring through the plurality of the first contact holes;
    a second passivation layer on the second wiring, the second passivation layer having a plurality of second contact holes exposing the second wiring, wherein the plurality of the second contact holes do not overlap the plurality of the first contact holes in a plan view;
    a third wiring on the second passivation layer, the third wiring being formed of a same material and formed in one piece, and connected to the second wiring through the plurality of second contact holes; and
    a driving integrated circuit ("IC") on the third wiring, a plurality of terminals of the driving IC contacting the third wiring, each of the plurality of terminals overlapping the plurality of the first contact holes and the plurality of the second contact holes in the plan view, and
    wherein the plurality of the first contact holes are arranged along a first direction,
    the plurality of the second contact holes are arranged along the first direction and spaced apart from the plurality of the first contact holes in a second direction perpendicular to the first direction, and
    each of the plurality of the second contact holes is located between adjacent two of the plurality of the first contact holes in the first direction.
2. The display device of claim 1, wherein the first contact hole is disposed between the second contact holes.
3. The display device of claim 2, wherein the first contact holes have depths substantially the same as one another.
4. The display device of claim 3, wherein the second contact holes have depths substantially the same as one another.
5. The display device of claim 2, wherein the first wiring comprises a material the same as that forming the gate line.
6. The display device of claim 5, wherein the second wiring comprises a material the same as that forming the data line.
7. The display device of claim 6, wherein the third wiring comprises a material the same as that forming the pixel electrode.
8. The display device of claim 2, further comprising an adhesive layer between the third wiring and the driving IC.
9. The display device of claim 8, wherein the adhesive layer is an anisotropic conductive film.
10. The display device of claim 1, wherein the size of the plurality of first contact holes is smaller than that of the plurality of second contact holes.
11. A method of manufacturing a display device, the method comprising:
    forming a first wiring and one of a gate line and a data line, the first wiring being formed of a same material and formed in one piece;
    forming a first passivation layer on a first substrate on the first wiring;
    forming a plurality of first contact holes which expose the first wiring in the first passivation layer;
    forming a second wiring and the other one of the gate line and the date line on the first passivation layer, the second wiring being formed of a same material and formed in one piece, and connected to the first wiring through the plurality of first contact hole;
    forming a second passivation layer on the second wiring;
    forming a plurality of second contact holes which expose the second wiring in the second passivation layer, wherein the plurality of the second contact holes do not overlap the plurality of the first contact holes in a plan view;
    forming a third wiring and a pixel electrode on the second passivation layer, the third wiring being formed of a same material and formed in one piece, and connected to the second wiring through the plurality of second contact holes; and
    disposing a driving IC on the third wiring, wherein a plurality of terminals of the driving IC contact the third wiring, each of the plurality of terminals overlapping the plurality of the first contact holes and the plurality of the second contact holes in the plan view, and
    wherein the plurality of the first contact holes are arranged along a first direction,
    the plurality of the second contact holes are arranged along the first direction and spaced apart from the plurality of the first contact holes in a second direction perpendicular to the first direction, and
    each of the plurality of the second contact holes is located between adjacent two of the plurality of the first contact holes in the first direction.
12. The method of claim 11, wherein each of the plurality of first contact hole is disposed between the plurality of second contact holes in a plan view.
13. The method of claim 12, wherein the first contact holes have depths substantially the same as one another.
14. The method of claim 13, wherein the second contact holes have depths substantially the same as one another.

15. The method of claim 14, wherein the first wiring comprises a material the same as that forming the gate line, and the second wiring comprises a material the same as that forming the data line.

16. The method of claim 15, wherein the third wiring comprises a material the same as that forming the pixel electrode.

17. The method of claim 16, wherein the driving IC is disposed on the third wiring using an adhesive layer, and the adhesive layer is an anisotropic conductive film.

* * * * *